United States Patent
Klima

(10) Patent No.: US 6,769,648 B2
(45) Date of Patent: Aug. 3, 2004

(54) PERSONAL AIRCRAFT DEVICE

(76) Inventor: William L. Klima, 234 Winsome La., Fredericksburg, VA (US) 22406

( * ) Notice: Subject to any disclaimer, the term of this patent is extended or adjusted under 35 U.S.C. 154(b) by 0 days.

(21) Appl. No.: 10/125,579

(22) Filed: Apr. 19, 2002

(65) Prior Publication Data

US 2003/0197089 A1 Oct. 23, 2003

(51) Int. Cl.⁷ .................................................. B64D 5/00
(52) U.S. Cl. .................... 244/138 R; 244/4 A; 244/900; 244/904
(58) Field of Search ............................. 244/138 R, 45 A, 244/900, 901, 904, 4 A

(56) References Cited

U.S. PATENT DOCUMENTS

| | | | | |
|---|---|---|---|---|
| 3,173,629 A | * | 3/1965 | Uhor | 244/46 |
| 4,212,441 A | * | 7/1980 | Ascani et al. | 244/46 |
| 4,253,625 A | * | 3/1981 | Dmitrowsky | 244/4 A |
| 4,379,532 A | * | 4/1983 | Dmitrowsky | 244/4 A |
| D277,398 S | * | 1/1985 | Johnston | D21/87 |
| 4,813,634 A | * | 3/1989 | Zuck | 244/122 A |
| 4,890,861 A | * | 1/1990 | Bachmann | 280/810 |
| 4,898,345 A | * | 2/1990 | Clayton | 244/4 A |

\* cited by examiner

Primary Examiner—Peter M. Poon
Assistant Examiner—Timothy D. Collins
(74) Attorney, Agent, or Firm—Law Offices of William L. Klima, P.C.

(57) ABSTRACT

A personal aircraft device ("PAD") and a powered personal aircraft device ("PPAD") configured to be ridden and/or releasably connected to a person or user. The personal aircraft device can be configured to provide a large array of maneuvers during sky diving or free fall, and perform somewhat as a lifting device requiring a parachute landing and/or alternatively can be configured to glide to a safe landing. The personal aircraft device and powered personal aircraft device according to the present invention provide for high performance, speed and/or maneuvering of a person or user during free fall, and can provide increased or significantly increased gliding capability versus free falling or deployment of a high performance parachute.

39 Claims, 13 Drawing Sheets

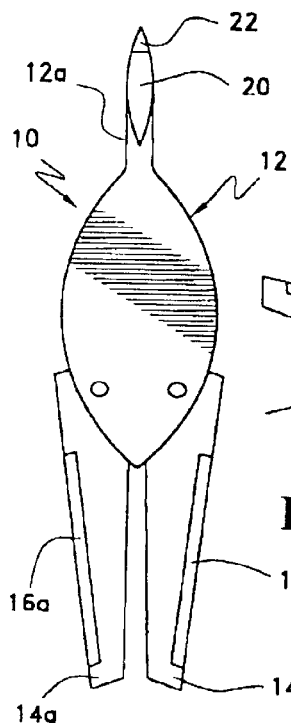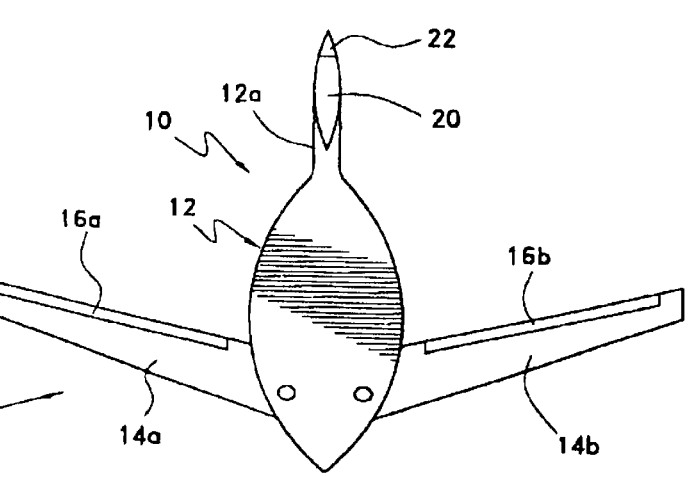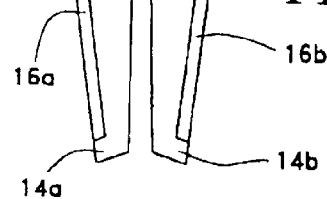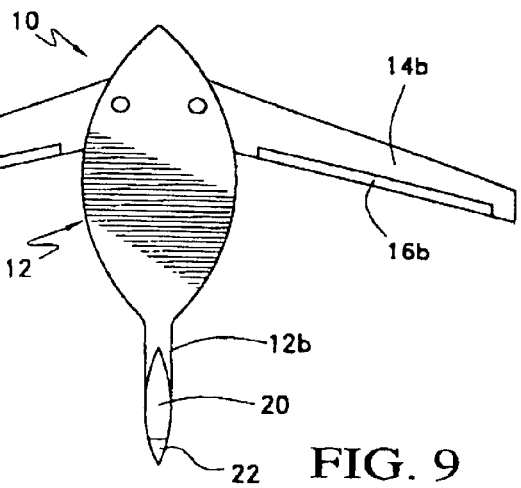
FIG. 6
FIG. 7
FIG. 8
FIG. 9

PERSONAL AIRCRAFT DEVICE

FIELD OF THE INVENTION

The present invention is directed to a personal aircraft device ("PAD") and a powered personal aircraft device ("PPAD"). Specifically, the present invention is directed to an aircraft device configured to be ridden by a person or user, and/or cooperate and releasably connect to a user's body.

BACKGROUND OF THE INVENTION

The concept of an aircraft or glider for accommodating a person so as to fly in air is old. The initial aircraft tended to be unpowered gliders, and/or otherwise configured to be launched from a higher elevation to a lower elevation. For example, a glider could be launched from a tower, wall, hill, rooftop, mountain, cliff, plateau or other suitable higher elevation. These original gliders and even the gliders of today are configured to have high glide ratios to provide a slow and safe descent from one higher elevation to a lower elevation, and land unassisted. Typically, gliders have wings with a high aspect ratio for providing the high glide ratio.

A powered aircraft capable of gaining altitude was invented, developed and flown by the Wright brothers at the famous site in Kitty Hawk, N.C. Other powered aircraft had been invented and created over the decades in the twentieth century into a wide array of aircraft for numerous applications from civilian aviation, commercial aviation, military aviation into all aspects of aerospace applications. There still exists new and commercially viable conceptual platforms and applications of aerospace, and the present invention is to provide a new aircraft platform and novel applications for a personal aircraft device ("PAD") and a powered personal aircraft device ("PPAD").

Ganev (U.S. Pat. No. 4,458,859) discloses a sail board configured for use both on waves and in the air. The board has a substantially fixed configuration, similar to existing fiberglass surf boards, and relies on the sail for maneuverability.

Further, sky diving including free falling and parachuting have been popular in past years. High performance parachutes have been developed for providing controlled turning, increased maneuverability and/or gliding.

The ability to provide increased performance, new maneuvers and/or completely new applications for a sky diving and flying with the personal aircraft device according to the present invention will become apparent based on the description of the present invention to be provided hereinbelow. Further, the concept of a FLYING BOARD™ or AIR BOARD™ will be described hereinbelow.

SUMMARY OF THE INVENTION

An object of the present invention is to provide a personal aircraft device ("PAD") or a powered personal aircraft device ("PPAD").

A second object according to the present invention is to provide a personal aircraft device including a support and/or board provided with a wing, and configured to be ridden and/or cooperate and releasably connect to a user.

A third object according to the present invention is to provide a personal aircraft device including a support and/or board provided with at least one movable control surface, and configured to cooperate and releasably connect to a user.

A fourth object according to the present invention is to provide a personal aircraft device including a support and/or board configured to cooperate and releasably connect to a person, a wing connected to and extending from the board, and at least one movable control surface associated with the board and/or wing.

A fifth object according to the present invention is to provide a personal aircraft device including a support and/or board configured to cooperate and releasably connect to a user, and a wing connected to the board. The wing configured to be deployed from a substantially non-operational configuration to an operational configuration.

A sixth object according to the present invention is to provide a personal aircraft device including a board configured to cooperate and releasably connect with a user, and a wing connected to the board, the wing configured to move from one configuration to another configuration.

A seventh object according to the present invention is to provide a personal aircraft device including a board configured to cooperate and releasably connect with a user, at least one wing connected to the board, the device configured to descend at a substantially steep glide ratio.

An eighth object according to the present invention is to provide a personal aircraft device including a board configured to cooperate and releasably connect with a user, and a wing connected to the board, the device configured to provide at least two (2) different glide ratios.

A ninth object according to the present invention is to provide a personal aircraft device, including a board configured to cooperate and releasably connect with a user, and a wing connected to the board, the wing configured to change from one aspect ratio to another aspect ratio.

A tenth object according to the present invention is to provide a personal aircraft device, including a board configured to cooperate and operationally connect with a user, and a wing, the device configured to be controlled by movement of at least one body part of the user.

The present invention is directed to a personal aircraft device to be ridden by a person or user, and/or configured to be releasably connected to the user. Preferably, the connection, coupling and/or linkage between the personal aircraft device according to the present invention and one or more body parts of the user creates an operational arrangement or system where the personal aircraft device and user become one and operate as a single aircraft unit. Thus, it is preferable that the personal aircraft device according to the present invention utilizes a board, board-like or board-type support configured to cooperate with a user's body in a particular configuration (e.g. laying down, serpentine, or other suitable orientation of the user's body). However, it is to be understood that other supports other than a board can be utilized in some embodiments of the personal aircraft device according to the present invention.

The personal aircraft device according to the present invention can be utilized in a wide variety of applications. However, preferred embodiments of the personal aircraft device according to the present invention are configured to be relatively small in size, easy to store, easy to deploy, highly maneuverable, provide high performance free fall or flight and in some embodiments can obtain a suitable glide ratio for potential safe unaided landing. Preferred embodiments of the personal aircraft device according to the present invention can be configured for use from exiting the top of a tall building, for example, during an emergency, or being deployed from another aircraft the same or similar currently used for sky diving or parachuting. Thus, it is important that the personal aircraft device when releasably connected to a person can manage to exit through a doorway or exit way of civilian, military or potentially some type of commercial aircraft.

Regarding deployment from aircraft, winged embodiments of the personal aircraft device according to the present invention preferably have wings that are stowed in a manner to substantially reduce the overall width of the personal aircraft device when connected to a user to allow exiting the aircraft, and then subsequent deployment of the wing after exiting the aircraft. It is somewhat desirable that the wings are deployed rapidly after exiting the carrier aircraft while the personal aircraft device has not yet accelerated to free fall velocity to reduce stress on the user and personal aircraft device when deploying the wings. However, certain embodiments of the personal aircraft device according to the present invention, particularly those having low aspect ratio wing or short wing span configurations, can be designed to allow deployment at any time, even during free fall, or redeployment after wings are stowed in midair after a previous deployment.

The embodiments of the personal aircraft device according to the present invention utilizing a board or board type aircraft platform can be configured so that the board provides very little aerodynamic effect (e.g. lift), or can be configured so that the board provides a significant aerodynamic effect (e.g. board acting as a lifting body or wing itself, or configured to provide other aerodynamic effects to provide roll, pitch and/or yaw of the aircraft). Preferred embodiments of the personal aircraft device according to the present invention provide a high to very high level of maneuverability of the personal aircraft device to allow rolls, loops, spirals, gliding maneuvers, high speed diving maneuvers, front or side sliding or backward sliding maneuvers, etc.

The personal aircraft device according to the present invention can be configured to provide a wide variety of different types of glide ratios. For example, the aspect ratio of the board and/or wing or combination can be selected and designed for particular applications and can have a fixed or variable geometry. For sport applications, the personal aircraft device according to the present invention can be configured to provide a substantially low glide ratio to provide a wide variety of maneuvers the same or similar to free falling sky divers. The personal aircraft device according to the present invention can be configured so that the glide ratio is such that a user would be required to wear a parachute that would necessarily be deployed prior to landing, since the personal aircraft device would not provide enough glide ratio to land safely without a parachute. Alternatively, the personal aircraft device according to the present invention can be configured to be highly maneuverable in free fall, however, provides enough of a glide ratio to safely land. In any event, it is desirable that either the user and/or the personal aircraft device is provided with a parachute (preferably redundant parachutes) in case of an emergency such as an equipment failure, personal distress, user passing out to be unconscious or configured to provide a variety of other failsafe measures. For other sports applications, the personal aircraft device according to the present invention can be configured to provide a substantial glide ratio to significantly extend air-time or flight-time for the user in the air, and may allow maneuvering and gliding to an extent to allow the user to reach a particular designated position or zone on the ground (e.g. near take off airport, particular landing field, or other desired landing zone or spot). For emergency applications, the personal aircraft device according to the present invention would be configured or designed to minimize or eliminate the need for any flight experience (e.g. like a parachute), however, provide some maneuverability, for example to avoid the side of a building or other buildings or obstructions when jumping from the top of a high building to increase the chances of a safe landing with a later deployed parachute.

For military applications, the personal aircraft device according to the present invention, can be configured to provide high speed free falls from significant altitudes to avoid detection and/or avoiding contact with enemy fire while also providing a significant glide ratio to allow the user to reach a designated landing zone. For example, a winged personal aircraft device according to the present invention can have the wing deployed immediately after exiting the carrier aircraft to allow the user to glide towards the designated landing zone at high altitude, then the wing stowed to allow very rapid speed descent to drop a significant portion of the altitude, and then redeployment of the wing to finalize gliding to the landing zone with or without a final parachute drop for the remainder of the altitude depending on the configuration of the personal aircraft device and/or the particular application or mission.

In some embodiments of the personal aircraft device according to the present invention, the personal aircraft device is configured to transform from one configuration to another configuration to provide different glide ratios to increase the flight envelope and/or performance of the personal aircraft device. For example, the personal aircraft device can be provided with a shorter or stubby set of deployable wings for high speed maneuverability, and a second set of high aspect ratio wings to allow gliding with a high glide ratio. In some configurations, both wing sets would sometimes be deployed and in other configurations and/or applications only one set of wings would be deployed at a time. In embodiments of the personal aircraft device according to the present invention having variable geometry wing configurations, the wings can be deployed, stowed and/or changed in configuration by a wide variety of methods, including but not limited to manual operation by the user (e.g. pushing, pulling, twisting, separating, etc. with one or more fingers and/or hands, arms, legs and/or other body parts or movements), mechanical actuator (e.g. levers, wires, bell cranks, cables, fulcrums, gears, cams, torsion bars, etc.), hydraulics, pneumatics and/or use of aerodynamic forces. A particularly suitable actuator would be the use of aerodynamic forces applied on parts or surfaces of the personal aircraft device in combination with other mechanical components including springs, dampers, fictional resistance devices to control, damp and/or limit movement. Further, the personal aircraft device can be provided with one or more air scoops designed to utilize differential air pressure to acuate air surfaces and/or pneumatics actuators. As further examples, the personal aircraft device can be flown in certain manners (e.g. sidewise or backwards or frontwards) to deploy and/or stow wing portions to change the direction of airflow relative to the personal aircraft device. The personal aircraft device can also be provided with hydraulic actuators powered by manually operated controls to provide maneuverability of the personal aircraft device according to the present invention.

The personal aircraft device according to the present invention can be configured to provide a wide variety of different types of stability depending on the particular applications thereof. The stability can be fixed or variable and be set by the configuration and design of the board, wing and/or other aerodynamic surfaces of the personal aircraft device. Optionally, the personal aircraft device according to the present invention can be provided with a flight stabilizing system. For example, the personal aircraft device according to the present invention can be provided with a computerized control and stabilizing system utilizing feedback from the user and/or sensors or detectors provided on the personal aircraft device to automatically control particular movable control surfaces and/or wing configurations to provide flight stability in use (e.g. fly-by-wire). The system can be partially manual or can be completely fly-by-wire and independent of any manual control of the user. The system may utilize one or more gyroscopes, GPS, satellite transreceiver or other navigation transreceiver, or other electronics for governing the control and stability of the personal aircraft device. In some applications, the control and stability system can be completely preprogrammed and/or variably programmed and controlled from a remote location (e.g. satellite, command center and/or field, for example, by painting a landing zone with a laser) so that the flight of the personal aircraft device is totally hands free from start to finish. However, the system is preferably or necessarily provided with a manual override in the event of unexpected circumstances, mechanical failure, emergency or other destabilizing factors.

The personal aircraft device according to the present invention can optionally be powered. For example, the board and/or wings can be provided with a small or miniaturized power plant and/or propulsion unit (e.g. propeller, duct fan, solid rocket booster, turboshaft, turbojet, turbofan or other suitable power plant or and/or propulsion unit) to increase the performance of the personal aircraft device. For example, by providing power, the personal aircraft device can transcend a greater horizontal distance from the drop zone, can attain higher speed both horizontally and/or vertically, can climb, and can provide a powered landing even with a relatively low aspect ratio of the board and/or wing combination thereof.

The personal aircraft device according to the present invention again preferably utilizes a board, board-like or board-type support or aircraft platform. The board platform of the personal aircraft device according to the present invention provides numerous advantages over other types of supports in that the board platform is configured to cooperate with a user's body, allows a user to grip the board with arms and/or legs, and provides a sense of protection and stability to the user. Thus, the use of a board as the basic structure or platform for the personal aircraft device according to the present invention is important. Variations and/or modifications of a basic board arrangement or platform can include recesses for body parts, gripping elements or protrusions for cooperating with the user's body parts (e.g. partial or full harness portion over user's shoulders, hand gripping portions, leg gripping portions, waist gripping portions, chest gripping portions, neck gripping portions), helmet, shield, bubble, canopy for partially or fully protecting the head of the user, in particular for providing a windshield to enhance the person's vision and/or reduce noise levels. Further, the personal aircraft device can be configured to provide one or more compartments for stowage of at least one parachute, personal gear, food and water, snacks, clothing, weapons, ammunition, explosives, hardware, first aid, medical supplies and potentially any other necessary or desirable packages or products depending on the particular application or mission. The personal aircraft device can be provided with GPS to provide positional data to the user and/or a transreceiver or transponder for providing remote tracking of the location of the personal aircraft device and/or control thereof for rescue and/or recovery of the user and/or personal aircraft device. Thus, the personal aircraft device according to the present invention can become a very sophisticated sport or military conceptual platform for numerous variable applications and operations, providing capabilities not available in current sport and military aircraft. Conceptually, the personal aircraft device according to the present invention becomes a highly maneuverable personnel carrier greatly increasing performance and capability in comparison with current sky diving or paratrooping capabilities today.

A more advanced embodiment of the personal aircraft device according to the present invention may include a body control unit (e.g. handheld) electrical cord (e.g. umbilical) or remote control device for operating the wings and/or movable control surfaces of the personal aircraft device. This device can be ergonomically designed to cooperate and couple with the hand, fingers, wrist, anus, mouth, neck, eyes, legs, ankles, feet, toes of the operator user. In versions of the personal aircraft device having a hood, helmet and/or canopy, a heads-up display and/or control can be implemented so that the user can simultaneously view data in controlling the device by eye movement to move in the direction the pilot is viewing (i.e. movement of pupil provides control signal for moving wings and/or control surfaces of personal aircraft device). In this manner, the pilot can operate the device completely hands free allowing the pilot to grip or hold onto portions of the personal aircraft device without interfering with the control thereof. However, in some embodiments control may be achieved by multiple inputs, for example, by both the eyes and hands and possibly the feet of the operator.

The personal aircraft device according to the present invention can be configured to accommodate a single rider or multiple riders.

The personal aircraft device according to the present invention can be made of aircraft quality metal (e.g. aluminum, titanium, steel components), or more preferably is made of a composite construction including one or more plastics, resins, molded plastic, laminated plastic, glass fibers, carbon fibers, Kevlar, ceramic fibers, ceramic sheets, wood, or other suitable base materials. It is highly desirable to make the personal aircraft device according to the present invention as light and as strong as possible (e.g. preferable in the range of two (2) pounds to one hundred fifty (150) pounds unpowered, more preferably in the range of two (2) pounds to seventy-five (75) pounds unpowered, and most preferably in the range of two (2) pounds to fifty (50) pounds unpowered), and almost indestructible during operation and use. Further, the entire personal aircraft device or components thereof can be designed and tailored to be flexible or resilient to allow the pilot to control the device by moving or bending aerodynamic surfaces (e.g. wing bending, elevator bending, horizontal stabilizer bending) without causing structural damage to components or the device itself. Due to the small size of the personal aircraft device according to the present invention, the personal aircraft device can be designed and constructed to withstand high aerodynamic and/or G-forces well beyond those tolerable by a human operator, and rugged enough to withstand hard landings, operational abuse during transportation and/or storage to provide significant reuse thereof to provide years of service. However, some versions could be designed for one time use or be disposable.

BRIEF DESCRIPTION OF THE DRAWINGS

FIG. 6 is a diagrammatic top view of the personal aircraft device shown in FIG. 1 (without canard wing) showing the wings swept forward and the personal aircraft device in a diving mode.

FIG. 7 is a diagrammatic top view of the personal aircraft device shown in FIG. 1 (without canard wing) showing the wings swept rearward and the personal aircraft device in a diving mode.

FIG. 8 is a diagrammatic top view of the personal aircraft device shown in FIG. 1 (without canard wing) showing the wings swept rearward and the personal aircraft device in a back end first diving mode.

FIG. 9 is a diagrammatic top view of the personal aircraft device shown in FIG. 1 (without canard wing) showing the wings swept forward and the personal aircraft device in a back end first diving mode.

DETAILED DESCRIPTION OF PREFERRED EMBODIMENTS

Figures 1, 2:
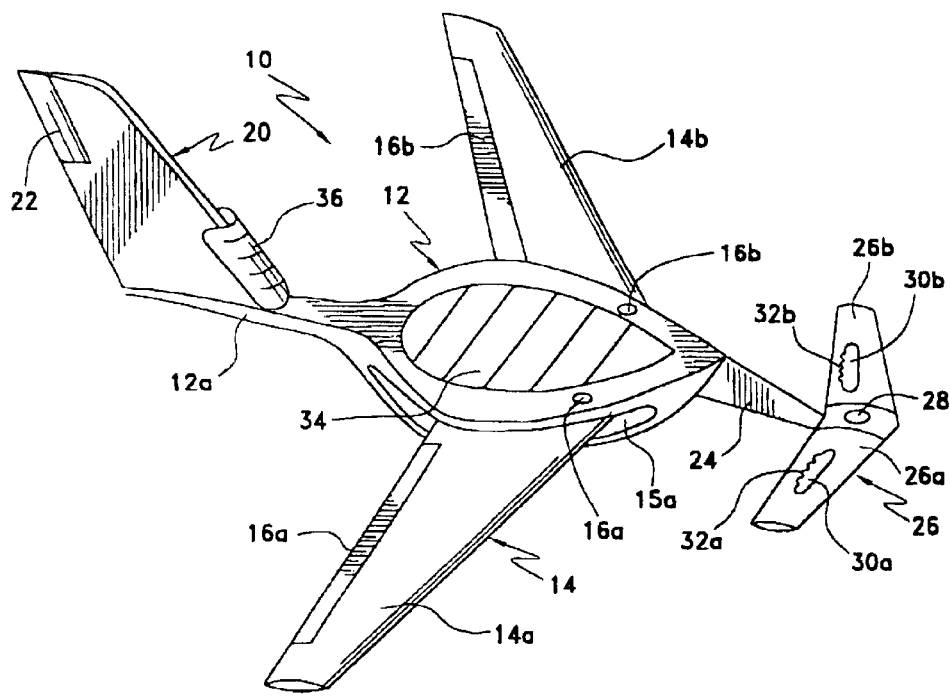
FIG. 1 is a first embodiment of a personal aircraft device ("PAD") according to the present invention.
FIG. 2 is a side elevational view of the personal aircraft device shown in FIG. 1.
Figure 3:
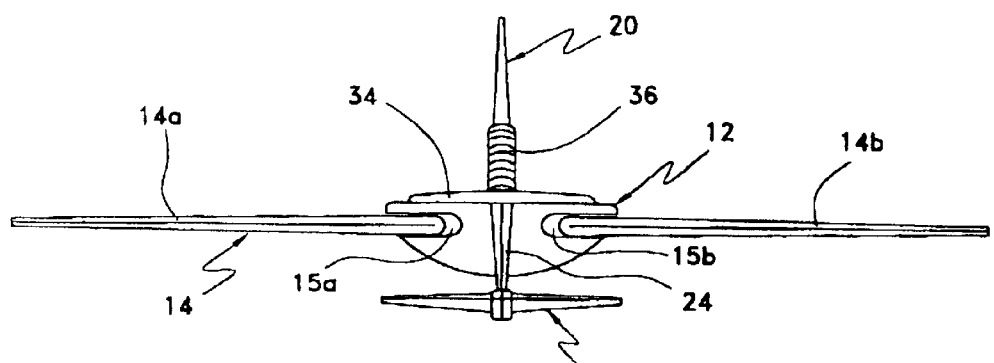
FIG. 3 is a front elevational view of the personal aircraft device shown in FIG. 1.
Figure 4:
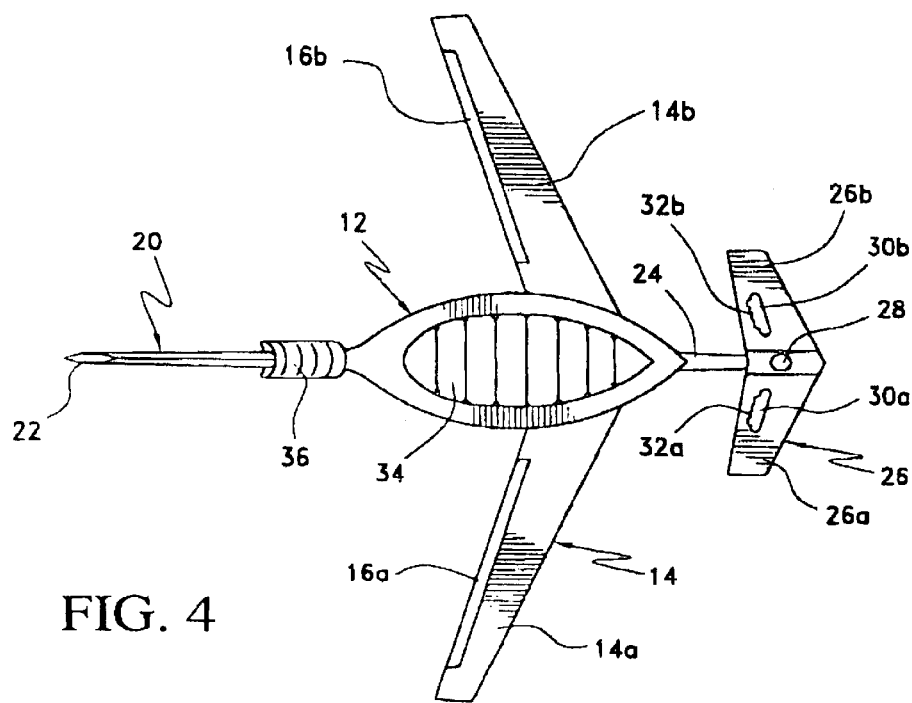
FIG. 4 is a top planar view of the personal aircraft device shown in FIG. 1.
Figure 5:
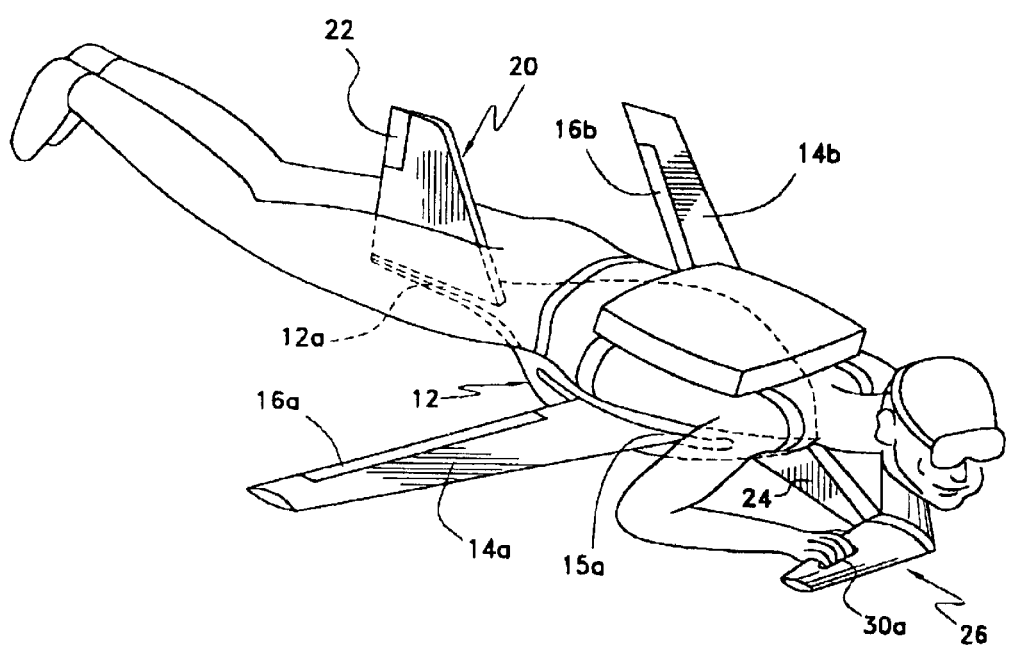
FIG. 5 is a perspective view of a person or user shown in ghost image riding the personal aircraft device shown in FIG. 1.
Figure 10:
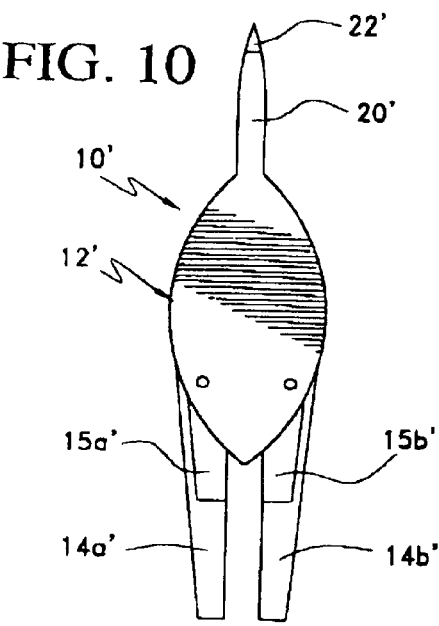
FIG. 10 is a diagrammatic top elevational view of a personal aircraft device shown in FIG. 1 modified with an additional set of shorter wings with both sets of wings swung forward and the personal aircraft device in a diving mode.
Figure 11:
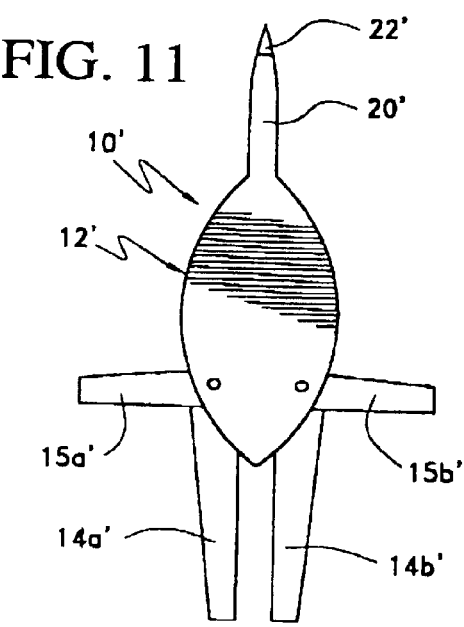
FIG. 11 is a diagrammatic top elevational view of a personal aircraft device shown in FIG. 1 modified with an additional set of shorter wings with the longer wings swept forward in a stowed position and the shorter wings are swept rearward in an operational position and the personal aircraft device in a diving mode.

A personal aircraft device ("PAD") 10 according to the present invention is shown in FIGS. 1–5.

The personal aircraft device 10 includes a board 12 and a wing 14. Specifically, the wing 14 includes a pair of separate wing portions 14a and 14b connected to and extending from opposite sides of the board 12. The wing portion 14a and wing portion 14b are hinged to the board 12 by pivotal connectors 16a and 16b, respectively, to allow the wing portions to swing forwardly and/or rearwardly. The wing portions 14a and 14b are provided with ailerons 16a and 16b respectively. The board 12 is provided with a pair of slots 15a and 15b to accommodate inboard portions of the wing portions 14a and 14b to allow hinged movement or swinging thereof.

The board 12 is provided with a tail 12a (e.g. boom) provided with a vertical stabilizer 20 having a movable rudder portion 22. The board 12 is also provided with another vertical stabilizer or boom 24 supporting a canard type wing 26. The wing 26 is connected to the boom 24 by a pivot connection 28 to allow the wing 26 to pivot or hinge relative to the boom 24. The wing 26 is provided with through holes 30a and 30b to provide handgrips 32a and 32b.

The board 12 is provided with a pad (e.g. foam or rubber pad) on an upper surface of the board 12 to provide improved gripping and/or cushioning for a person laying down on the board 12 with his or her stomach or abdomen contacting the pad 34 when riding the personal aircraft device 10. The vertical stabilizer 20 is provided with another pad 36 to provide a seat rest for the user.

The flight of the personal aircraft device 10 according to the present invention can be controlled in various manners. For example, the pivoting movement of the canard wing 26 by use of the arms and hands of the person riding the device 10 can be coupled to the movement of the ailerons 16a and 16b and/or rudder portion 22. The flight control system can include mechanical drives, shafts, pulleys, cables, hydraulics, pneumatics or any other suitable coupling or mechanical components to connect and coordinate movement of the movable air surfaces. Alternatively, the movements can be controlled by an electrical system having electrical actuators to move controlled surfaces or a hybrid between mechanical and electrical systems for this purpose. In some embodiments, the canard wing 26 is connected to the boom 24 to provide a second tilt access, as shown in FIG. 2 so that the canard wing 26 also acts as a horizontal stabilizer and/or elevator to provide pitch for the personal aircraft device 10 to dive or climb. The wing portions 26a and 26b can be setup to tilt together and/or independently to allow further types of maneuverability of the personal aircraft device 10. In a sophisticated version of the personal aircraft device according to the present invention, all movable aerodynamic surfaces can be configured to be moved independently and/or dependently based upon a preprogrammed or variable program control system that can be mechanical, hydraulic, pneumatic, aerodynamic and/or electrical. For example, an onboard fly-by-wire electrical control system can be preprogrammed and/or variably programmed for changing the program before and/or during flight to control the flight dynamics of the personal aircraft device according to the present invention.

The deployment of the wings can be achieved through various configurations or designs of the personal aircraft device 10. To simplify the configuration or design of the personal aircraft device 10, it is preferred that the wing portions 14a and 14b are deployed by use of aerodynamic forces thereon. For example, as shown in FIGS. 6 and 7, after the personal aircraft device 10 exits a carrier aircraft (not shown) and dives downwardly, the wing portions 14a and 14b are unlatched or decoupled from the configuration shown in FIG. 6, and then aerodynamic force moves the wing portions 14a and 14b to the deployed configuration shown in FIG. 7. Instead of using a latch or coupling system, the personal aircraft device 10 can be configured or designed so that the wings automatically deploy at a particular air velocity eliminating the need for a latch or coupling. Further, the wing portions 14a and 14b may be connected to the board with springs and/or dampeners to control the movement of the wing portions 14a and 14b from the stowed position (FIG. 6) to the deployed configuration (FIG. 7) so that both the angular rate or movement of the wing portions 14a and 14b is greatly reduced for operator safety and/or to reduce dynamic loads on the wing portions 14a and 14b and their connections to the board 12 during deployment. As an alternative method, the wing portions 14a and 14b are deployed rearwardly as shown in FIG. 8, and the wing portions 14a and 14b are deployed when the personal aircraft device 10 is initially dropped from the carrier aircraft and maneuver rear end first downwardly.

In another embodiment of the personal aircraft device 10' according to the present invention, as shown in FIGS. 10–13, the personal aircraft device 10' is provided with an additional set of wing portions 15a and 15b. The shorter set of wing portions 15a and 15b allow for high speed maneuverability while the longer set of wings 14a and 14b allow for lower speed maneuvering. In some operations both sets of wings can be deployed to provide even greater lift (e.g. like biplane) to potentially allow a low speed unassisted landing without parachute deployed. For example, in FIG. 10 the personal aircraft device 10' has just exited a carrier aircraft and in FIG. 1 the smaller set of wing portions 15a and 15b are then deployed for high speed maneuverability.

Figure 12:
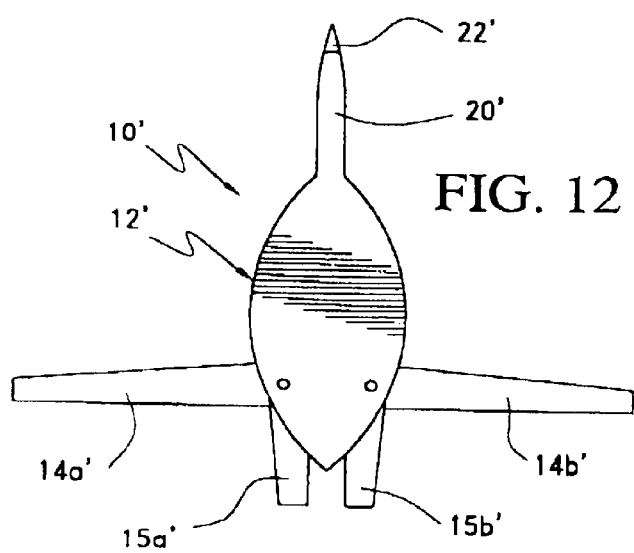
FIG. 12 is a diagrammatic top elevational view of a personal aircraft device shown in FIG. 1 modified with an additional set of shorter wings with the longer wings swept rearward in an operational position and the shorter wings are swept forward in a stowed position and the personal aircraft device in a diving mode.
Figure 13:
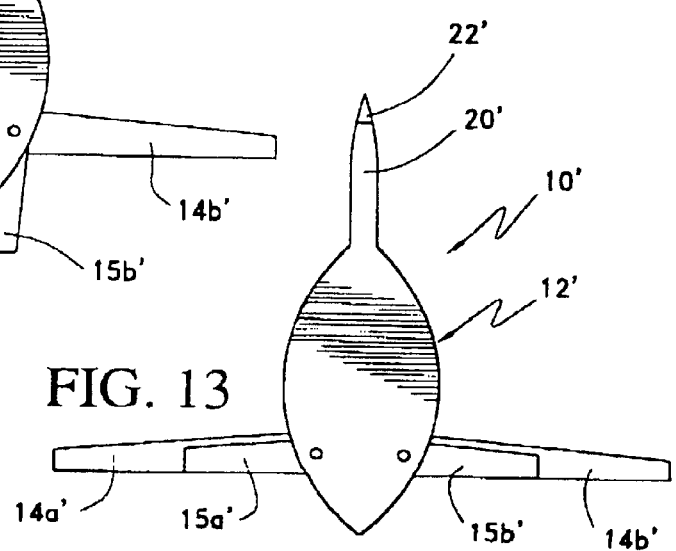
FIG. 13 is a diagrammatic top elevational view of a personal aircraft device shown in FIG. 1 modified with an additional set of shorter wings with both sets of wings are swept rearward in operational positions and the personal aircraft device in a diving mode.

In FIG. 12 the smaller set of wing portions 15a and 15b have been stowed and the larger set of wing portions 14a and 14b have been deployed for lower speed maneuverability during a last portion of the flight, and in FIG. 13 both set of wing portions are deployed for landing the device itself. Due to the small size of the personal aircraft device according to the present invention, the personal aircraft device can be designed and constructed to withstand high aerodynamic and g-forces well beyond those tolerable by a human operator, and rugged enough to withstand hard landings, operational abuse during transportation and/or storage to provide significant reuse thereof to provide years of service.

Figure 14:
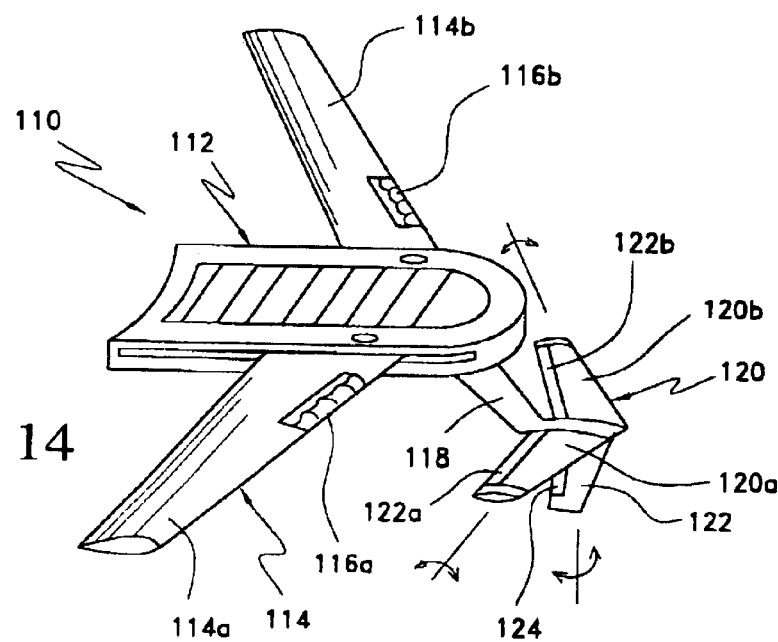
FIG. 14 is a perspective view of a third embodiment of the personal aircraft device according to the present invention.

Another embodiment of the personal aircraft device 110 according to the present invention is shown in FIG. 14.

The personal aircraft device 110 includes a board 112 provided with a wing 114. The wing 114 includes wing portions 114a and 114b extending from opposite sides of the board 112. The wing portions 114a and 114b are connected to the board 112 by pivotal connections 116 to allow the wings to hinge or swing from a stowed position to a deployed position (as shown). For example, the wing portions 114a and 114b may swing forward to a position similar to that of the personal aircraft device 10 shown in FIG. 6. The wing portions 114a and 114b are provided with handgrip portions 116a and 116b to allow a user to manually move the wing portions 114a and 114b during operation. For example, the wing portions 114a and 114b can be moved differentially at different positions to cause turning or spiraling.

A vertical stabilizer or boom 118 extends from the board 112 and supports a canard wing 120 having wing portions 120a and 120b. The wing portions 120a and 120b are provided with movable elevator portions 122a and 122b to provide turning capability. For example, the movement of the wing portions 114a and 114b can be coupled to the movement of the elevator portions 122a and 122b. A vertical stabilizer 122 extends downwardly from the wing 120 and is provided with a rudder portion 124. Optionally, the wing portions 120a and 120b can be configured to tilt as indicated and the wing 120 can be configured to yaw as indicated by a user gripping the wing 120 and manually moving these wing surfaces.

Figure 15:
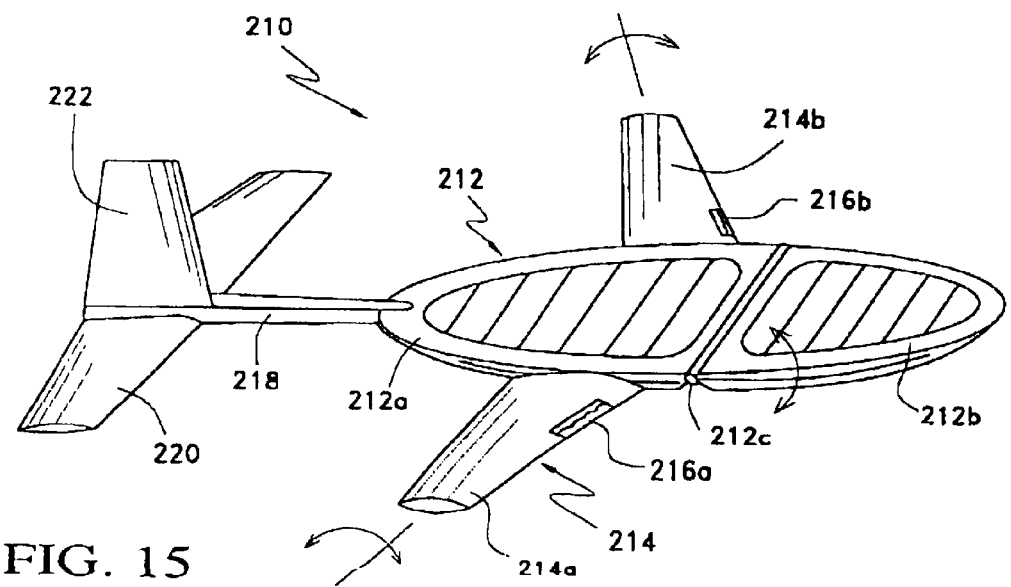
FIG. 15 is a perspective view of a fourth embodiment of the personal aircraft device according to the present invention.

Another embodiment of the personal aircraft device 210 is shown in FIG. 15.

The personal aircraft device 210 includes board 212 provided with a wing 214 having wing portions 214a and 214b extending from opposite sides of the board 212. The wing portions 214a and 214b are provided with handgrip portions 216a and 216b, and the wing portions 214a and 214b are configured to tilt as indicated to cause turning and/or spiraling.

The board 212 includes a stationary portion 212a and a movable portion 212b connected by a hinge 212c together. The movement of the board portion 212b upwardly and downwardly causes the board to act like a horizontal stabilizer provided with an elevator to cause climbing or diving of the personal aircraft device 210.

A boom 218 extends from the rear portion of the board 212 to support a tailor combined horizontal stabilizer 220 and vertical stabilizer 222. The horizontal stabilizer 220 and vertical stabilizer 222 can have a fixed configuration as shown, or can be provided with elevator portions and/or rudder portions, respectively, to provide additional flight control. The board 212 is provided with pad portions 224a and 224b for increasing the grip and/or providing comfort to the user.

Figure 16:
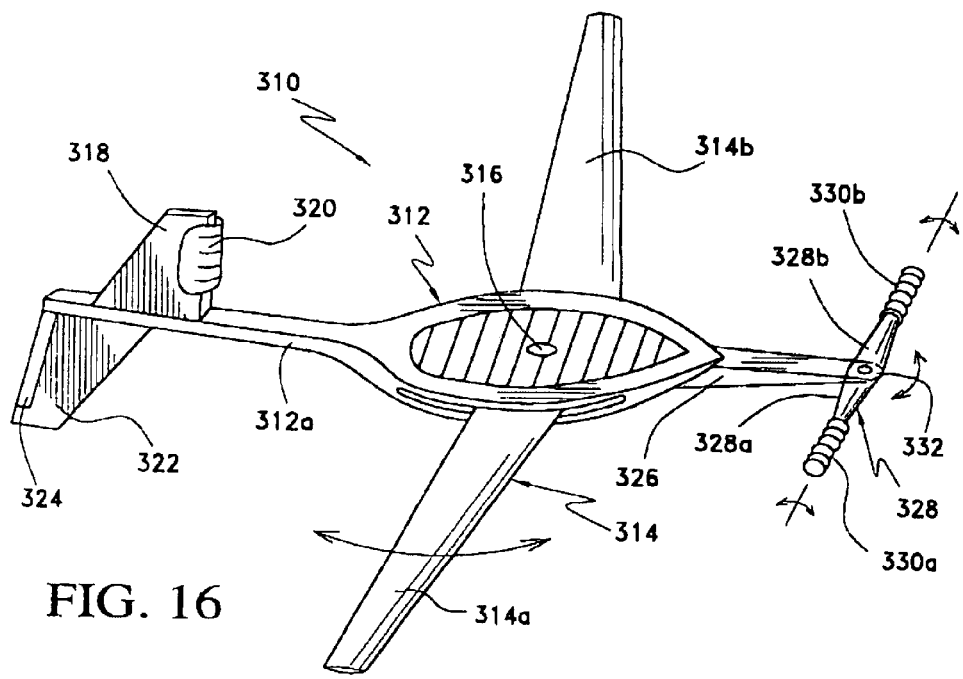
FIG. 16 is a perspective view of a fifth embodiment of the personal aircraft device according to the present invention.

Another embodiment of the personal aircraft device 310 according to the present invention is shown in FIG. 16. The personal aircraft device 310 includes a board 312 provided with a wing 314 having wing portions 314a and 314b extending from opposite sides of the board 312. The wing 314 is connected to the board by a pivotal connector 316 to provide a pivoting wing configuration.

A boom 312a extends rearwardly from the board 312 and is provided with a vertical support 318 provided with a seat pad 320. A vertical stabilizer 322 extends downwardly from the boom 312a. The vertical stabilizer 322 is provided with a rudder portion 324. A boom 326 extends forwardly from the board 312 and supports a canard wing 328 having wing portions 328a and 328b. The ends of the wing portions 328a and 328b are provided with handgrips 330a and 330b, respectively. The wing 328 is connected to the boom 326 by pivotal connector 332 to allow yaw movement thereof, and the wing portions 328a and 328b are configured to tilt as indicated.

The movement of the wing 328 can be coupled to the movement of the wing 314 to allow a user to push and pull on the handgrips 330a and 330b for turning the personal aircraft device 310. The movement of the wing 328 can pivot in the same direction as the wing 314, however, during some operations the wings may be coupled to pivot opposite to each other. Further, movement of the wing 328 can be coupled to movement of the rudder portion 324 of the vertical stabilizer 322.

Figure 17:
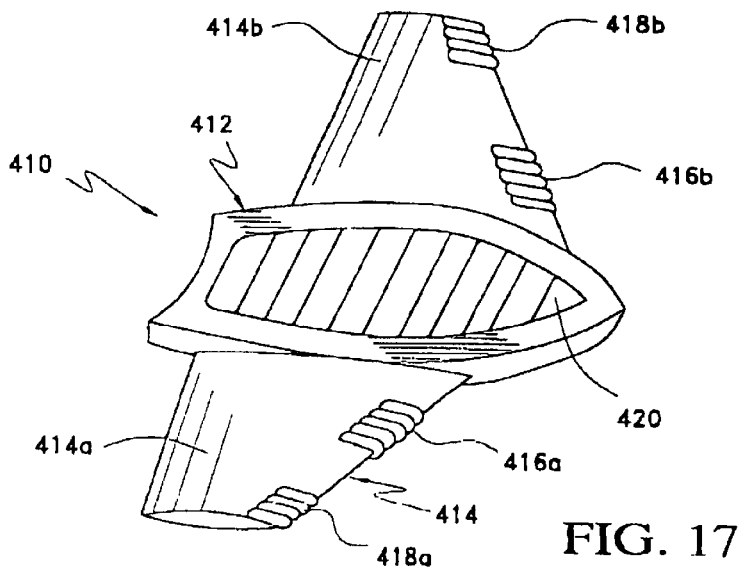
FIG. 17 is a perspective view of a sixth embodiment of the personal aircraft device according to the present invention.

Another embodiment of the personal aircraft device 410 according to the present invention is shown in FIG. 17.

The personal aircraft device 410 includes a board 412 provided with a wing 414 having a pair of wing portions 414a and 414b extending from opposite sides of the board 412. The wing 414 is provided with an inner set of handgrips 416a and 416b and an outer set of handgrips 418a and 418b. A pad 420 is provided on an upper surface of the board 412. The wing portions 414a and 414b are configured or designed to allow a user to warp the wing portions 414a and 414b by gripping the outer handgrips 418a and 418b and applying manual force upwardly and/or downwardly thereon. Specifically, the wing portions 414a and 414b are configured or designed to be fairly flexible and resilient so that the tips of the wing portions 414a and 414b can be twisted, raised upwardly, lowered downwardly simultaneously or differentially to allow various flight maneuvers.

Figure 18:
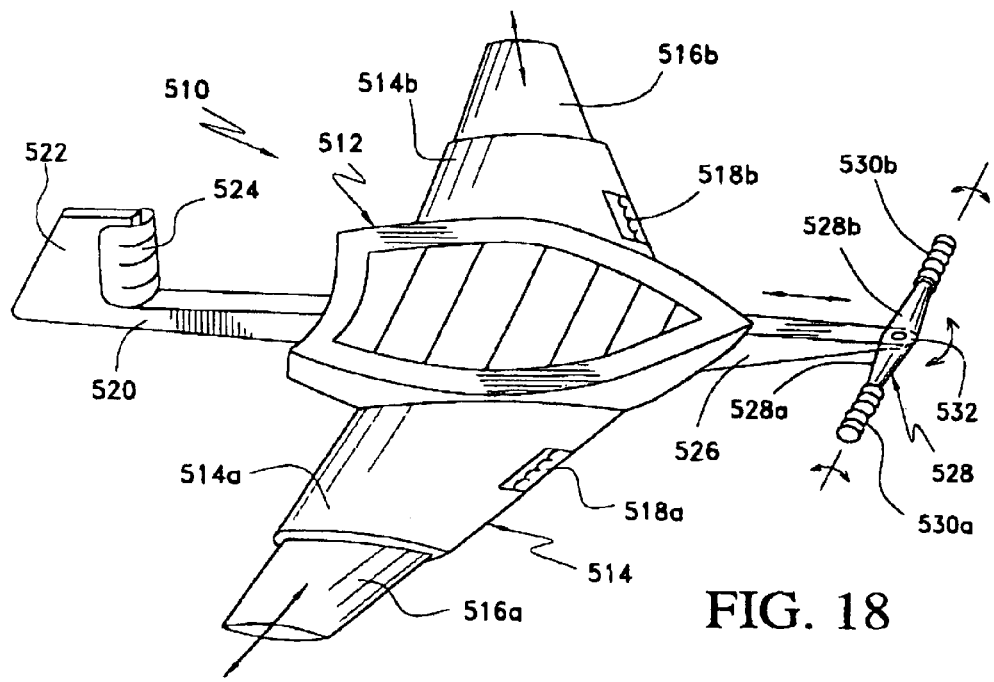
FIG. 18 is a perspective view of a seventh embodiment of the personal aircraft device according to the present invention.

Another embodiment of the personal aircraft device 510 according to the present invention is shown in FIG. 18.

The personal aircraft device 510 includes a board 512 provided with a wing 514 having wing portions 514a and 514b extending from opposite sides of the board 512. The wing portions 514a and 514b are provided with extendable and/or retractable wing tip portions 516a and 516b. The wing portions 514a and 514b are also provided with handgrips 518a and 518b.

A boom 520 extends rearwardly from the board 512 and includes a vertical support 522 provided with a seat pad 524. A boom 526 extends forwardly from the board 512 and supports a canard wing 528 having a pair of wing portions 528a and 528b provided with handgrips 530a and 530b. The wing 528 is connected to the boom 526 by a pivotal connector 532 to allow yaw movement thereof. The wing portions 528a and 528b are configured to tilt as indicated. Further, the boom 526 is configured to be moved forwardly and rearwardly relative to the board 512. In one embodiment, the movement of the wing 528 by the hand operation of the user can be coupled with movement of the wing tip portions 516a and 516b so that wing portions extend outwardly or retract inwardly together.

Figure 19:
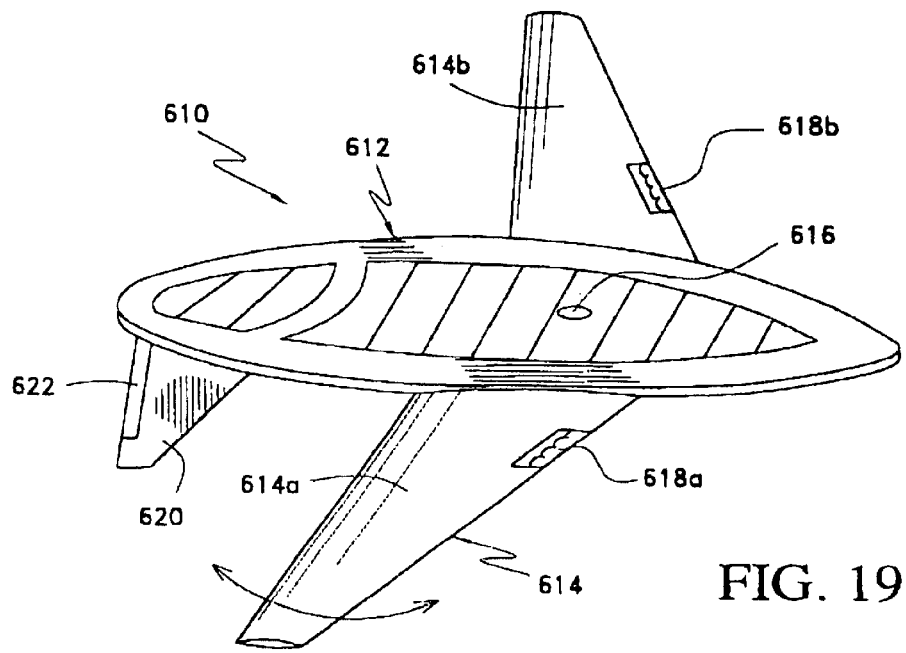
FIG. 19 is a perspective view of an eighth embodiment of the personal aircraft device according to the present invention.

Another embodiment of the personal aircraft device 610 according to the present invention is shown in FIG. 19.

The personal aircraft device 610 includes a board 612 provided with a wing 614 having wing portions 614a and 614b extending from opposite sides of the board 612. The wing 614 is connected to the board 612 by a pivotal connector 616, and the wing 614 is provided with a pair of handgrips 618a and 618b to allow a user to grip the wing 614 and manually move the wing to cause swinging and turning the personal aircraft device 610.

A vertical stabilizer is connected to the board 612 and extends downwardly there from. The vertical stabilizer 620 is provided with a rudder portion 622. The movement of the wing 614 can be coupled to the movement of the rudder portion 622 to provide coordinated turns.

Figure 20:
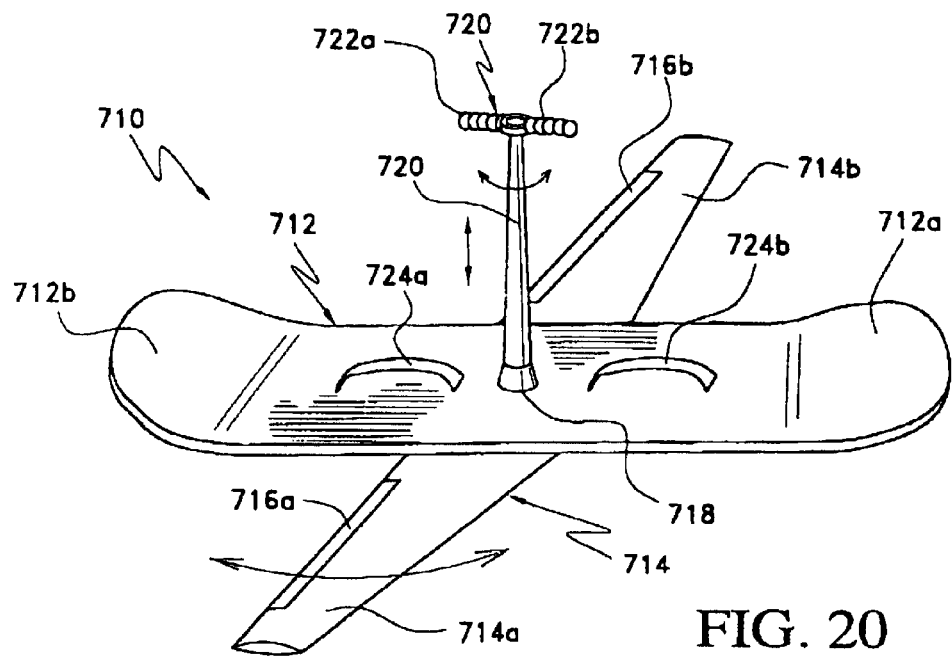
FIG. 20 is a perspective view of a ninth embodiment of the personal aircraft device according to the present invention.

Another embodiment of the personal aircraft device 710 according to the present invention is shown in FIG. 20.

The personal aircraft device 710 includes a board 712 provided with wing 714 having wing portions 714a and 714b extending from opposite sides of the board 712. The board 712 includes a forward board tip portion 712a, which is bent upwardly, and a rear board tip portion 712b which is bent upwardly, which board tip portions 712a and 712b provide lift depending on the direction of movement of the personal aircraft device 710. The wing is provided with a set of ailerons 716a and 716b. The wing 714 is connected to the board 712 by the pivotal connector 718. A vertical spindle 720 extends upwardly from the board 712, and is provided with a handle 720 having hand grips 722a and 722b. The spindle 720 can be rigidly mounted to the board 712, or alternatively, can be configured to rotate as indicated and coupled with the movement of the wing 714. For example, the spindle 720 can be directly connected to the wing 714 to allow a user to twist the spindle 720 by use of the handgrips 722a and 722b to swing the wing 714 to turn the personal aircraft device 710. In another example, the spindle 720 is connected to a gear mechanism or electric motor for turning the wing 714. Further, the spindle 720 can be configured to reciprocate upwardly and downwardly as indicated, for example, to control the movement of the ailerons 716a and 716b. The board 712 is provided with a pair of flipped straps 724a and 724b to operationally connect the user to the personal aircraft device 710.

Figure 21:
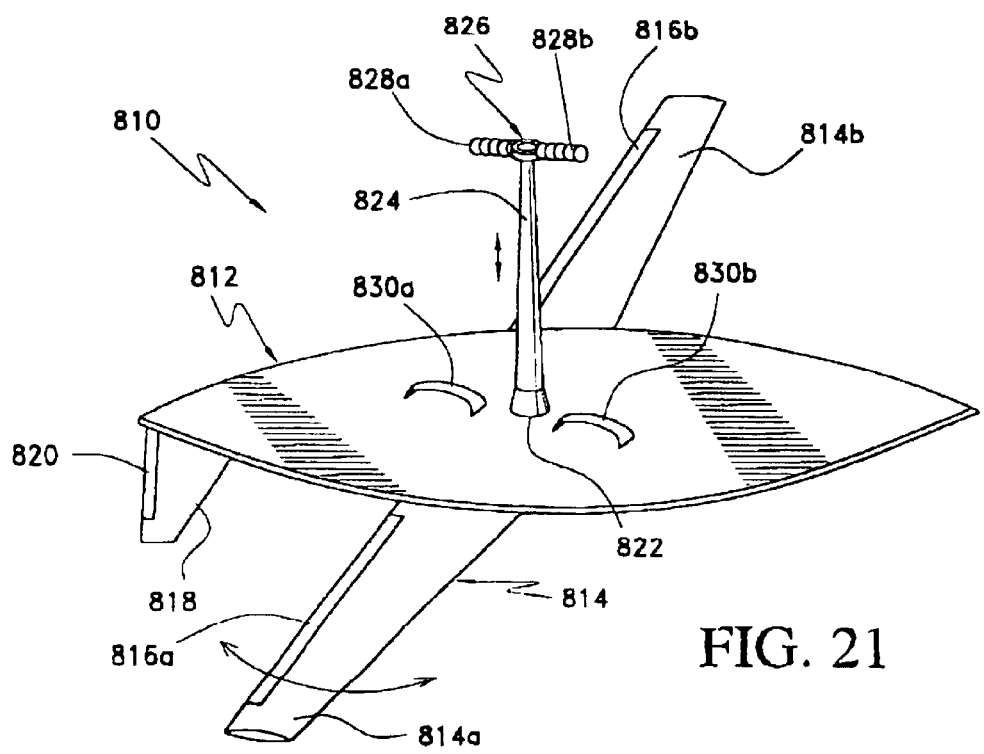
FIG. 21 is a perspective view of a tenth embodiment of the personal aircraft device according to the present invention.

Another embodiment of the personal aircraft device 810 according to the present invention is shown in FIG. 21.

The personal aircraft device 810 includes a board 812 provided with a wing 814 having wing portions 814a and 814b extending from opposite sides of the board 812. The wing 814 is provided with a set of ailerons 816a and 816b for turning the personal aircraft device 810. A vertical stabilizer is connected to the board 812 and extends downwardly therefrom. The vertical stabilizer 818 is provided with a movable rudder portion 820.

The wing 814 is connected to the board 812 by a pivotal connector 822 to allow the wing 814 to swing relative to the board 812. A spindle 824 is connected to the board 812 and extends upwardly therefrom. The spindle 824 is provided with a handle 826 having handle portions 828a and 828b. The spindle 824 can be rigidly connected to the board 812, or alternatively, can be configured to rotate and be coupled with the movement of the wing 814. For example, the spindle 824 can be directly connected to the wing 814, or can be connected indirectly through a set of gears or electrical motor. The spindle can be configured to rotate in the same direction as the wing 814, or can be configured to rotate opposite to the rotation of the wing 814. Further, the spindle 824 can be configured to be moved upwardly and downwardly as indicated, for example, to control movement of the ailerones 816a and 816b to cause the personal aircraft device 810 to turn. The board 812 is provided with set of foot straps 830a and 830b for operationally connecting a user to the personal aircraft device 810. Further, the handle 826 and spindle 824 provide a support and grip for the user during operation so that the user can maintain a standing position.

Figure 22:
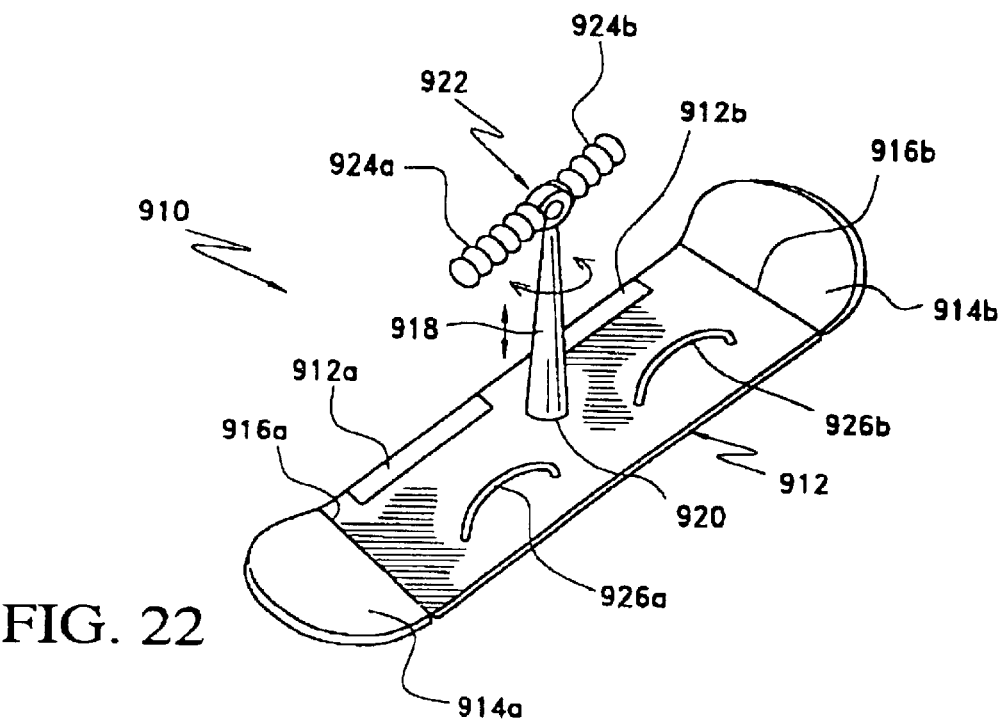
FIG. 22 is a perspective view of an eleventh embodiment of the personal aircraft device according to the present invention.

An eleventh embodiment of the personal aircraft device 910 according to the present invention is shown in FIG. 22.

The personal aircraft device 910 includes a board 912 provided with wing tip portions 914a and 914b extending from opposite ends of the board 912. The wing tip portions 914a and 914b can be configured to be stationary with the board 912, or alternatively, can be configured to move relative to the board 912 (e.g. providing a hinge 916a and 916b between the wing tip portions 914a and 914b and the board 912).

A spindle 918 is connected to the board 912 and extends upwardly therefrom. The spindle 918 can be rigidly connected to the board 912, or as shown, can be configured to be rotated relative to the board 912 by providing a pivotal connection 920 therebetween. The spindle 918 is provided with a handle 922 having a set of handgrips 924a and 924b.

The board 912 is provided with a set of ailerons 912a and 912b, and a set of foot straps 926a and 926b to operationally connect a user with the personal aircraft device 910. The spindle 918 can be configured to move the ailerones 912a and 912b by rotation thereof as indicated and move the wing tip portions 914a and 914b by up and down movement of the spindle 918 as indicated. Alternatively, the rotation of the spindle 918 can actuate the wing tip portions 914a and 914b and rotation of the spindle can actuate the ailerons 912a and 912b, or the personal aircraft device 910 can be configured to switch from one mode to the other mode back and forth.

Figure 23:
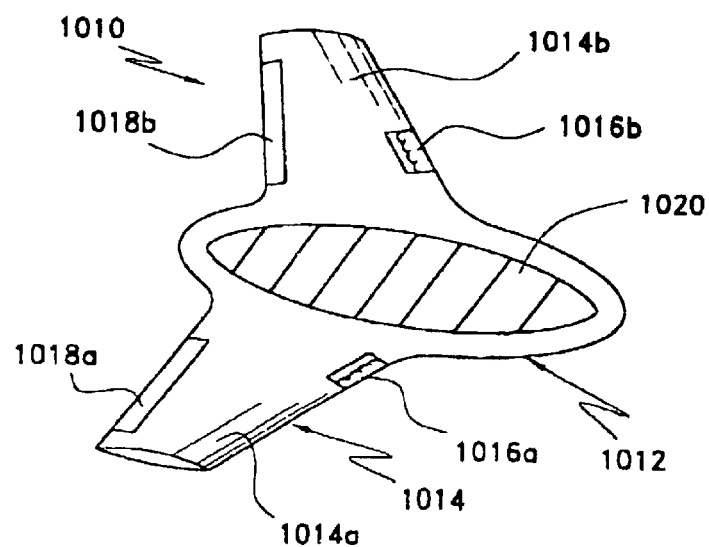
FIG. 23 is a perspective view of a twelfth embodiment of the personal aircraft device according to the present invention.

A twelfth embodiment of the personal aircraft device 1010 according to the present invention is shown in FIG. 23.

The personal aircraft device 1010 includes aboard 1012 provided with wing 1014 having wing portions 1014a and 1014b extending from opposite sides of the board 1012. The wing 1014 is provided with a pair of handgrip actuators 1016a and 1016b coupled to a set of ailerones 1018a and 1018b. The handgrip actuators 1016a and 1016b can be pushed or pulled to actuate at least one of the ailerones 1018a and/or 1018b. The board 1012 is provided with a pad 1020 to provide increased grip and/or comfort to the user.

Figure 24:
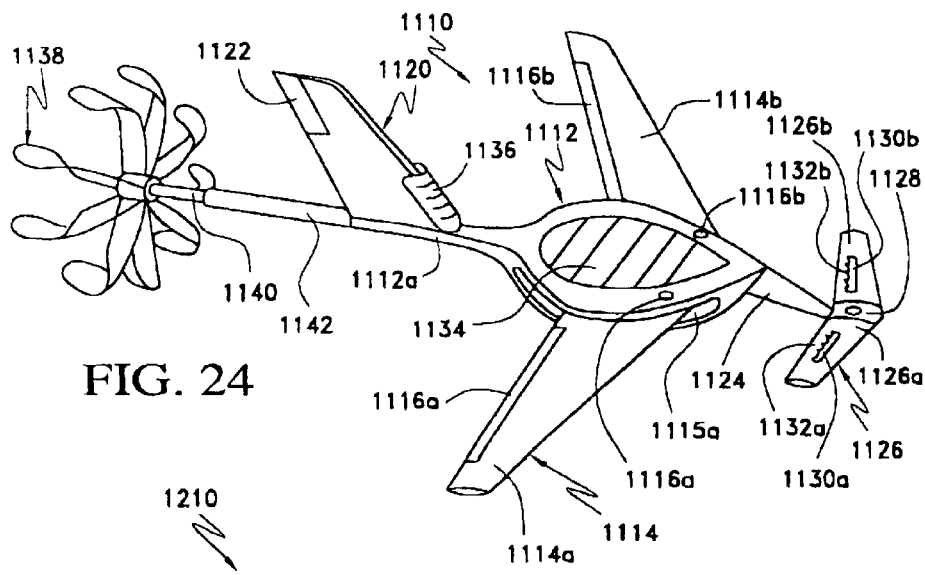
FIG. 24 is a perspective view of the personal aircraft device according to the present invention as shown in FIG. 1, however modified with a pusher type propeller and power plant to become a powered personal aircraft device ("PPAD") according to the present invention.

A thirteenth embodiment of a powered personal aircraft device 1110 according to the present invention is shown in FIG. 24.

The powered personal aircraft device 1110 ("PPAD") is substantially the same or similar to the first embodiment shown in FIG. 1, however, is provided with a power plant (not shown) for powering a high efficiency propeller 1138. Specifically, the power plant is located within a lower portion of the board 1112, and is connected to the propeller 1138 by a drive shaft 1140 supported by an outer support shaft 1142. The power plant can be a small air breathing power plant such as a small internal combustion engine or turbo shaft engine.

Figure 25:
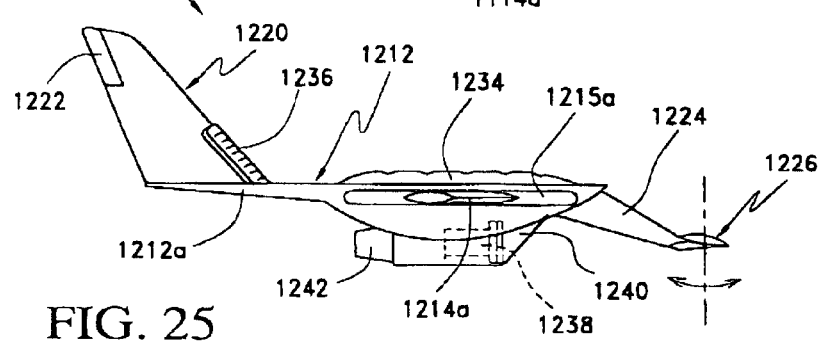
FIG. 25 is a side elevational view of another embodiment of the powered personal aircraft device according to the present invention.
Figure 26:
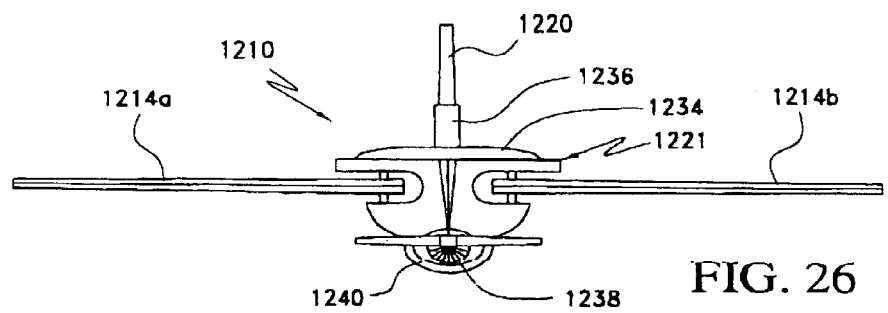
FIG. 26 is a front elevational view of the powered personal aircraft device shown in FIG. 25.

A fourteenth embodiment of a powered personal aircraft device 1210 according to the present invention is shown in FIGS. 25 and 26.

The powered personal aircraft device 1210 is substantially the same or similar to the embodiment of the personal aircraft device shown in FIG. 1, however, is provided with a small turbojet or turbo fan jet engine 1238 disposed within a nacelle 1240 located at a lower portion of the board 1212 with a nozzle portion 1242 extending from the rear thereof.

The powered personal aircraft device ("PPAD") according to the present invention include both flight controls and controls for operating and controlling the power plants. The controls for the power plant can be located on portions of the board, boom, wing, canard wing and/or provided on a control panel located on or extending from any of the components of the powered personal aircraft device to allow easy access to the user. The power plant control can be hardwired and/or can include one or more remote controls held, worn or otherwise located or associated with the user of the powered personal aircraft device. For example, a handheld wrist strapped remote control unit can be worn by the user so that the user can both grip portions of the personal aircraft device or powered personal aircraft device during certain operations and/or actively control the power plant by finger, hand, arm, shoulder, abdomen, leg, ankle, foot, toe movement, eye movement, mouth movement or a wide variety of other types of interactive control with the users body portions. Further, the power plant can potentially be preprogrammed prior to deployment and/or controlled by another operator located at a remote location through radio, cell, microwave and/or satellite transmissions, for example, via a transreceiver. Further, the personal aircraft device or powered personal aircraft device according to the present invention can be provided with communications to allow one-way, two-way or multiple-way communications locally or remotely. For example, a plurality of separate operators operating in close proximity would potentially have communications between each personal aircraft device or powered personal aircraft device during a mission along with communications to one or more remote locations to monitor and evaluate a particular mission.

The personal aircraft device ("PAD") and powered personal aircraft device ("PPAD") according to the present invention are preferably made from cutting edge materials and methods of construction to enhance strength, durability and performance while minimizing cost and weight. It is particularly preferable that the devices are constructed to be reusable, and rugged and durable to withstand high G forces, high aerodynamic forces, withstand rough landings, withstand rough handling and transportation, and otherwise maintain operability with minimum maintenance throughout their operational life. For example, the personal aircraft device and powered personal aircraft device according to the present invention are preferably made of composite materials, including fiberglass, KEVLAR, carbon fiber, beryllium fiber, wood composite and/or aircraft quality metals such as aluminum, steel and titanium. Most likely, the board and air surface, including the wings, ailerones, horizontal stabilizer, elevator, vertical stabilizer, rudder will be made of resin type composite materials such as KEVLAR and/or carbon fiber. The wing may include one or more transverse metal spars located along the length of the wing to enhance overall strength and the booms may include metal bars, rods, and/or tubing wrapped with resin composite, again to increase overall strength of these particular components. The pad material made be made from a foam, rubber or neoprene type material. The moveable control surfaces and internal control components such as cables, hinges, cams, gears, push rods, pull rods, bell cranks, and other types of mechanical, hydraulic and/or pneumatic actuators can be made some of metal and/or plastic components depending upon the engineering and specifications resulting therefrom. In any event, the state of the art building materials and construction methods for state of the art fighter jets, cruise missiles, air-to-surface missiles, surface-to-air missiles, rockets and/or space shuttle technology should be applied to produce a highly reliable, safe, user friendly, lightweight, durable, inexpensive, reusable and high performance personal aircraft or powered personal aircraft device according to the present invention.

A person or user of the personal aircraft device according to the present invention can ride and/or be releasably connected to the personal aircraft device or powered personal aircraft device in a variety of different manners, as shown in FIGS. 27–30.

Figure 27:
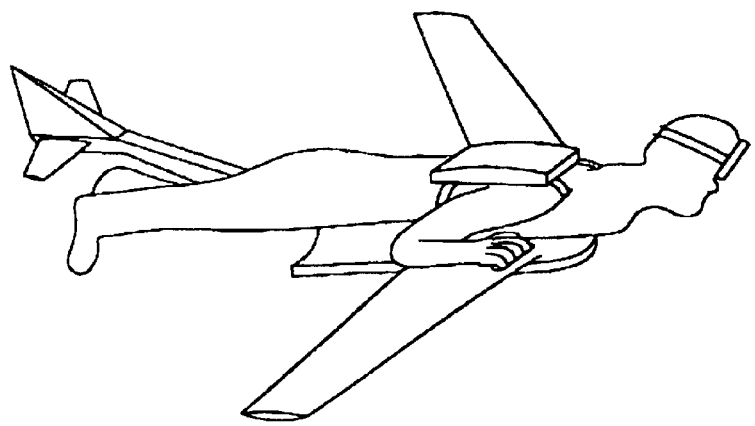
FIG. 27 is a diagrammatic perspective view of a person or user riding a personal aircraft device according to the present invention in a laying down headfirst position.

As shown in FIG. 27, a person lays on top of the board of the personal aircraft device to ride same. The person is shown holding onto the wing of the personal aircraft device with his or her legs wrapping around the rear tail boom of this particular personal aircraft device. In addition to just physically gripping and holding onto the personal aircraft device, the personal aircraft device can be fitted with releasable straps, shackles, mechanical couplers or other types of restraint devices to releasably connect or secure the person during operation to the personal aircraft device. In the embodiment shown in FIG. 27, the person is laying down on the board with his or her stomach in contact with the board of the personal aircraft device.

Figure 28:
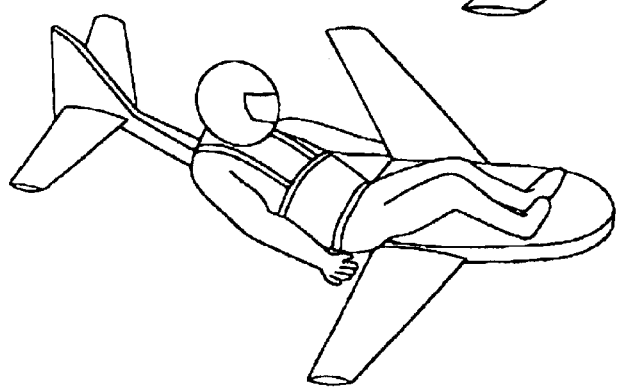
FIG. 28 is a diagrammatic perspective view of a person or user riding a personal aircraft device according to the present invention in a serpentine position with the head rearward.

In the embodiment shown in FIG. 28, the person rides on top of the board of the personal aircraft device in a serpentine position. The person's feet are positioned on an inclined footrest while his hands grip handgrips extending from opposite sides of the board. In the embodiments shown in FIGS. 27 and 28, preferably the person or user independently wears a parachute on his or her back and a reserve chute on the front of his or her chest or abdomen. In addition, the personal aircraft device itself can be provided with a separate parachute or recovery chute. For example, the person or user can detach him or herself in midair from the personal aircraft device, and then deploy his or her parachute and a recovery chute can be manually or automatically deployed or set for deployment to allow the personal aircraft device to parachute itself. However, preferably, the person or user in combination with the personal aircraft device can remain connected together and safely land together by the parachute connected to the user and/or gliding to a secure landing for embodiments having a sufficient glide ratio for such safe landings.

Figure 29:
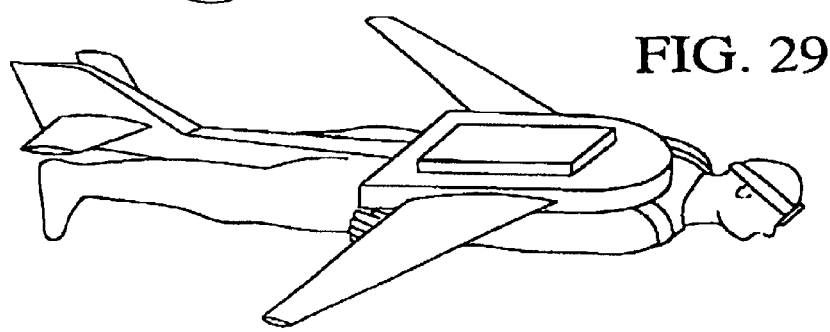
FIG. 29 is a diagrammatic perspective view of a person or user fitted with a personal aircraft device on his or her back.

In the embodiment shown in FIG. 29, the personal aircraft device is worn on the back of the person or user, and can be releasably secured to the person by releasable belts or couplings. Alternatively, the board of the personal aircraft device can be fitted or provided with a substantially rigid over the shoulder harness for releasable connection with the personal aircraft device. The personal aircraft device is shown with an external parachute configured for safe landing of both the personal aircraft and person connected together. Alternatively, or in addition, the person or user wears a separate parachute and potentially an additional safety chute worn on his or her chest.

Figure 30:
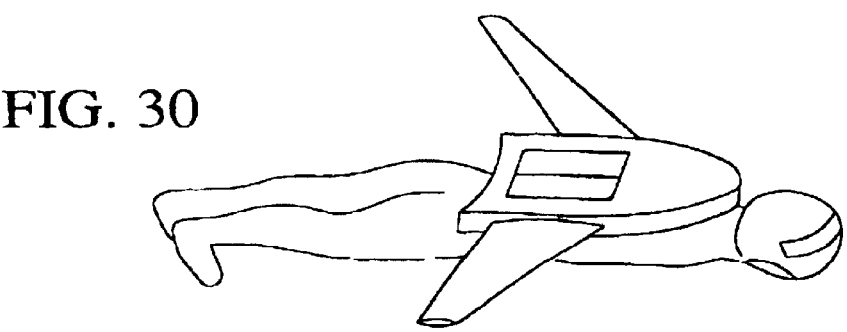
FIG. 30 is a diagrammatic perspective view of another embodiment of a personal aircraft device fitted on the back of a person or user.

In the embodiment shown in FIG. 30, the personal aircraft device is worn on the back of the person or user, and the personal aircraft device is provided with an internal parachute deployed through exit doors provided on an upper surface of the board of the personal aircraft device. Again, the person or user can also wear a separate parachute on his or her back and a safety chute on his or her chest.

Figure 31:
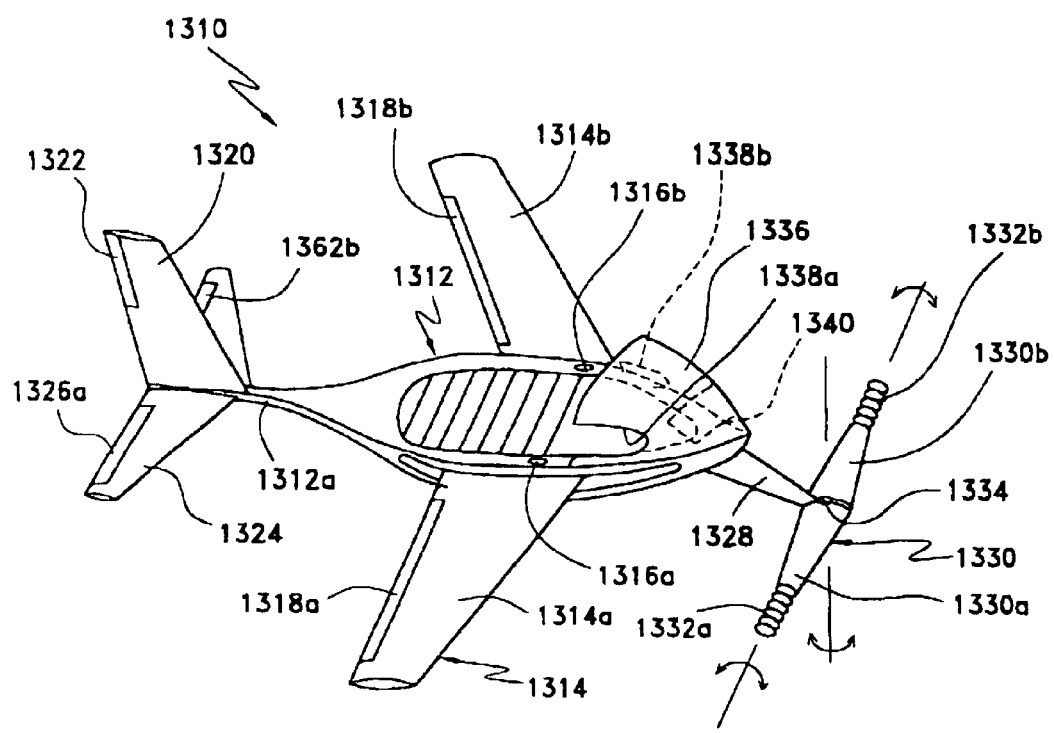
FIG. 31 is a perspective view of a fifteenth view of the personal aircraft device according to the present invention.

A fifteenth embodiment of the personal aircraft device 1310 according to the present invention is shown in FIG. 31.

The personal aircraft device 1310 includes a board 1312 provided with wing 1314 having wing portions 1314a and 1314b. The wing portions 1314a and 1314b are connected to the board 1312 by pivotal connectors 1316a and 1316b. The wing 1314 is provided with a set of ailerons 1318a and 1318b. The board 1312 is provided with a tail portion 1312a which is provided with a vertical stabilizer 1320 having a rudder portion 1322 and a horizontal stabilizer 1324 provided with elevator portions 1326a and 1326b. A boom or vertical stabilizer 1328 extends forward from the board 1312 supporting a canard wing 1330 having wing portions 1330a and 1330b provided with handgrip portions 1332a and 1332b, respectively. The wing 1330 is connected to the boom 1328 by pivotal connection 1334, and the wing portions 1330a and 1330b can be configured to tilt as indicated.

The board 1312 is provided with a see-through canopy 1336 provided with notches 1338a and 1338b to accommodate the shoulders and upper arms of the person or user of the personal aircraft device 1310. The canopy, can optionally be provided with a heads-up display 1340 mounted on or a portion of the see-through canopy 1336. The heads-up display can provide a variety of control and guidance to the personal aircraft device 1310. Further, the canopy 1336 protects the person's or user's head, reduces aerodynamic drag, reduces noise level to the person or user, and eliminates air stream or wind on the user's head and face.

What is claimed is:

1. A personal aircraft device, comprising:
 a board exposed to outside airflow during flight and configured to allow a user to ride on an upper surface thereof and actuate at least one control surface; and
 a wing connected to said board, said wing including wing portions extending from opposite sides of said board during operation and configured for providing lift to said personal aircraft device, said wing changing configuration at least once during flight to move away from a longitudinal axis operation of said personal aircraft device said at least one movable control surface connected to at least one of said board and said wing.

2. A device according to claim 1, wherein said at least one movable control surface is connected to said board.

3. A device according to claim 1, wherein said at least one movable control surface is connected to said wing.

4. A device according to claim 1, wherein said at least one movable control surface is connected to both said board and said wing.

5. A device according to claim 1, wherein said wing is provided with at least one movable wing portion.

6. A device according to claim 1, wherein said wing is configured to move from one position to another position.

7. A device according to claim 1, wherein said wing is configured to be selectively moved from one configuration to another configuration.

8. A device according to claim 7, wherein said wing is configured to be selectively deployed from a stowed configuration to an operational configuration.

9. A device according to claim 8, wherein said wing is configured to be stowed away in a substantially non-operational configuration and can be selectively deployed to said operational configuration.

10. A device according to claim 8, wherein said wing is configured to be stowed away in a partial operational configuration and can be selectively deployed to a fully operational configuration.

11. A device according to claim 8, wherein said wing is configured to be selectively stowed away after being previously deployed.

12. A device according to claim 8, wherein said wing is configured to be selectively deployed and selectively stowed away repeatedly.

13. A device according to claim 8, wherein the personal aircraft device is configured so that said wing is actively deployed by use of aerodynamic force applied to the personal aircraft device.

14. A device according to claim 12, wherein the personal aircraft device is configured so that said wing is actively deployed by use of aerodynamic force applied to said wing.

15. A device according to claim 1, wherein the personal aircraft device is configured so that said wing is actively deployed by use of at least one selected from the group consisting of aerodynamic force, mechanical force, hydraulic force and pneumatic force.

16. A device according to claim 1, wherein the personal aircraft device is configured to perform as a glider when said wing is in the operational position.

17. A device according to claim 1, including a propulsion device connected to the personal aircraft derive and configured to provided powered flight of said device.

18. A device according to claim 1, wherein said wing includes at least one wing portion configured to swing from a stowed positioned to an operational position.

19. A device according to claim 17, wherein said wing includes a pair of wing portions configured to swing from the stowed position to the operational position.

20. A device according to claim 18, wherein said wing portions are configured to swing forward from the stowed position to the operational position.

21. A device according to claim 18, wherein said wing portions are configured to swing backward from the stowed position to the operational position.

22. A device according to claim 1, wherein said wing is a pivotal wing configured to pivot from a stowed position to an operational position.

23. A device according to claim 1, wherein said wing is configured to extend from a stowed position to an operational position.

24. A device according to claim 1, wherein the personal aircraft device is provided with at least one movable control surface for controlling flight of said device.

25. A device according to claim 1, wherein the personal aircraft device is configured to be deformable for controlling flight of said device.

26. A device according to claim 1, wherein at least one portion of said wing is configured to warp for controlling flight of the personal aircraft device.

27. A device according to claim 1, including a vertical fin section connected to said board.

28. A device according to claim 1, including a horizontal stabilizer connected to said board.

29. A device according to claim 17, including a horizontal stabilizer connected to said board.

30. A device according to claim 1, including a canard wing connected to said board.

31. A device according to claim 20, including a horizontal stabilizer connected to said board.

32. A device according to claim 1, wherein the personal aircraft device is configured to perform as a lifting body.

33. A device according to claim 1, wherein said board is configured to provide substantially no lift to the personal aircraft device during level flight.

34. A device according to claim 1, wherein said board is configured to provide lift to the personal aircraft device.

35. A device according to claim 1, wherein said personal aircraft device is configured to operationally connect to a user laying head forward and face down on top of said board.

36. A device according to claim 1, wherein said personal aircraft device is configured to operationally connect to a user laying head rear and face up on top of said board.

37. A device according to claim 1, wherein said personal aircraft device is configured to operationally connect to a user's back.

38. A device according to claim 1, wherein said wing is configured to provide differential lift between said wing portions.

39. A device according to claim 1, wherein said wing is defined by an airfoil.

* * * * *